US008827792B2

(12) United States Patent
Sylla et al.

(10) Patent No.: US 8,827,792 B2
(45) Date of Patent: *Sep. 9, 2014

(54) COORDINATING GAME EVENTS BETWEEN A STATIONARY WAGERING GAME MACHINE AND AN ASSOCIATED PORTABLE GAME MACHINE

(71) Applicant: WMS Gaming, Inc., Waukegan, IL (US)

(72) Inventors: Craig J. Sylla, Round Lake, IL (US); James M. Rasmussen, Chicago, IL (US); Larry J. Pacey, Northbrook, IL (US); Mark B. Gagner, West Chicago, IL (US); Timothy J. Durham, Oak Park, IL (US)

(73) Assignee: WMS Gaming, Inc., Waukegan, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/666,165

(22) Filed: Nov. 1, 2012

(65) Prior Publication Data

US 2013/0059650 A1 Mar. 7, 2013

Related U.S. Application Data

(63) Continuation of application No. 12/674,400, filed as application No. PCT/US2008/073645 on Aug. 20, 2008, now Pat. No. 8,323,099.

(60) Provisional application No. 60/957,039, filed on Aug. 21, 2007.

(51) Int. Cl.
*G06F 17/00* (2006.01)
*G06F 19/00* (2011.01)

(52) U.S. Cl.
USPC .................. 463/16; 463/23; 463/40; 463/42; 463/25; 273/138.1; 273/138.2; 273/454

(58) Field of Classification Search
USPC ................ 463/16, 23, 25, 40, 42; 273/138.1, 273/138.2, 454
See application file for complete search history.

(56) References Cited

U.S. PATENT DOCUMENTS 5,470,079 A 11/1995 LeStrange et al.
5,741,183 A 4/1998 Acres (Continued)

FOREIGN PATENT DOCUMENTS

JP 2007082613 4/2007

OTHER PUBLICATIONS

PCT Application No. PCT/US08/73645 International Preliminary Report on Patentability, Sep. 7, 2010 , 14 pages.

(Continued)

*Primary Examiner* — Pierre E Elisca
(74) *Attorney, Agent, or Firm* — DeLizio Gilliam, PLLC

(57) ABSTRACT

A portable game machine is associated with a stationary wagering game machine. With resources of both the portable game machine and the stationary wagering game machine, the portable game machine and the stationary wagering game machine provide a wagering game experience. The portable game machine detects occurrence of a game event at the associated stationary wagering game machine, and, in response, determines a cumulative or bonus game event triggered by the detected game event. The portable game machine then invokes the triggered game event at the portable game machine.

20 Claims, 11 Drawing Sheets

(56) References Cited

U.S. PATENT DOCUMENTS

| | | | | |
|---|---|---|---|---|
| 5,937,390 | A | 8/1999 | Hyodo | |
| 6,089,975 | A | 7/2000 | Dunn | |
| 6,110,043 | A | 8/2000 | Olsen | |
| 6,315,666 | B1 | 11/2001 | Mastera et al. | |
| 6,676,522 | B2 | 1/2004 | Rowe et al. | |
| 6,712,698 | B2 | 3/2004 | Paulsen et al. | |
| 6,846,238 | B2 | 1/2005 | Wells | |
| 7,850,528 | B2 | 12/2010 | Wells | |
| 8,025,565 | B2 * | 9/2011 | Leen et al. | 463/23 |
| 2004/0214641 | A1 | 10/2004 | Giobbi | |
| 2006/0035707 | A1 | 2/2006 | Nguyen et al. | |
| 2007/0087804 | A1 | 4/2007 | Knowles et al. | |
| 2007/0243925 | A1 * | 10/2007 | LeMay et al. | 463/20 |
| 2008/0096659 | A1 | 4/2008 | Kreloff et al. | |
| 2008/0108405 | A1 | 5/2008 | Brosnan et al. | |
| 2009/0131146 | A1 | 5/2009 | Arezina et al. | |
| 2009/0138133 | A1 | 5/2009 | Buchholz et al. | |
| 2009/0176559 | A1 | 7/2009 | Buchholz et al. | |
| 2009/0197673 | A1 | 8/2009 | Bone et al. | |
| 2009/0239657 | A1 | 9/2009 | Ryan et al. | |
| 2010/0222141 | A1 | 9/2010 | LaSalvia et al. | |
| 2010/0227670 | A1 | 9/2010 | Arezina et al. | |
| 2010/0234097 | A1 | 9/2010 | Gelber et al. | |
| 2011/0124401 | A1 | 5/2011 | Durham et al. | |
| 2012/0129611 | A1 | 5/2012 | Rasmussen et al. | |
| 2012/0135798 | A1 * | 5/2012 | Leen et al. | 463/25 |
| 2013/0331184 | A1 * | 12/2013 | Kelly et al. | 463/31 |

OTHER PUBLICATIONS

PCT Application No. PCT/US08/73645 International Search Report, Nov. 3, 2008 , 12 pages.

U.S. Appl. No. 12/674,400 Final Office Action, May 24, 2012 , 13 pages.

U.S. Appl. No. 12/674,400 Office Action, Dec. 16, 2011 , 21 pages.

* cited by examiner

COORDINATING GAME EVENTS BETWEEN A STATIONARY WAGERING GAME MACHINE AND AN ASSOCIATED PORTABLE GAME MACHINE

RELATED APPLICATIONS

This application claims the priority benefit to, and is a continuation application of, U.S. application Ser. No. 12/674,400, filed on Feb. 19, 2010. The Ser. No. 12/674,400 application claims priority benefit of PCT Application No. PCT/US08/73645, filed on Aug. 20, 2008, which claims the priority benefit of U.S. Provisional Application Ser. No. 60/957,039 filed Aug. 21, 2007.

FIELD

Embodiments of the invention generally relate to the field of wagering game machines, and, more particularly, to a coordinating game events between a stationary wagering game machine and a portable wagering game machine associated with the portable game machine.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE DRAWINGS

The present embodiments may be better understood, and their numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present embodiments. However, it is understood that the described embodiments may be practiced without these specific details. For instance, well-known instruction instances, protocols, structures and techniques have not been shown in detail in order not to obfuscate the description.

The term "docking" is used in the specification. The term "docking" is typically used to describe the physical coupling of two devices. Although "docking" as used herein includes the physical coupling of a portable wagering game machine and a stationary wagering game machine, the term is also used to encompass various techniques for associating a portable wagering game machine ("PGM") with a stationary wagering game machine ("SGM"). For example, a PGM may be associated with a SGM in a non-physical manner (e.g., in accordance with 801.11 g, using RFID technology, etc.).

Docking a portable wagering game machine with a stationary wagering game machine allows a wagering game experience to be provided to a user with both the portable wagering game machine and the stationary wagering game machine. The resources of both wagering game machines are used to deliver a wagering game experience that the machines may not be capable of delivering individually. For instance, game content of a portable wagering game machine may supplement and/or augment the game content of a stationary wagering game machine. As another example, a portable wagering game machine may add functionality that is auxiliary to gaming to a stationary wagering game machine (e.g., electronic funds transfer, location determination for hospitality services, etc.). As depicted in the figures below, docking a portable wagering game machine with a stationary wagering game machine allows flexibility and new opportunities in delivery of a wagering game experience.

Figure 1:
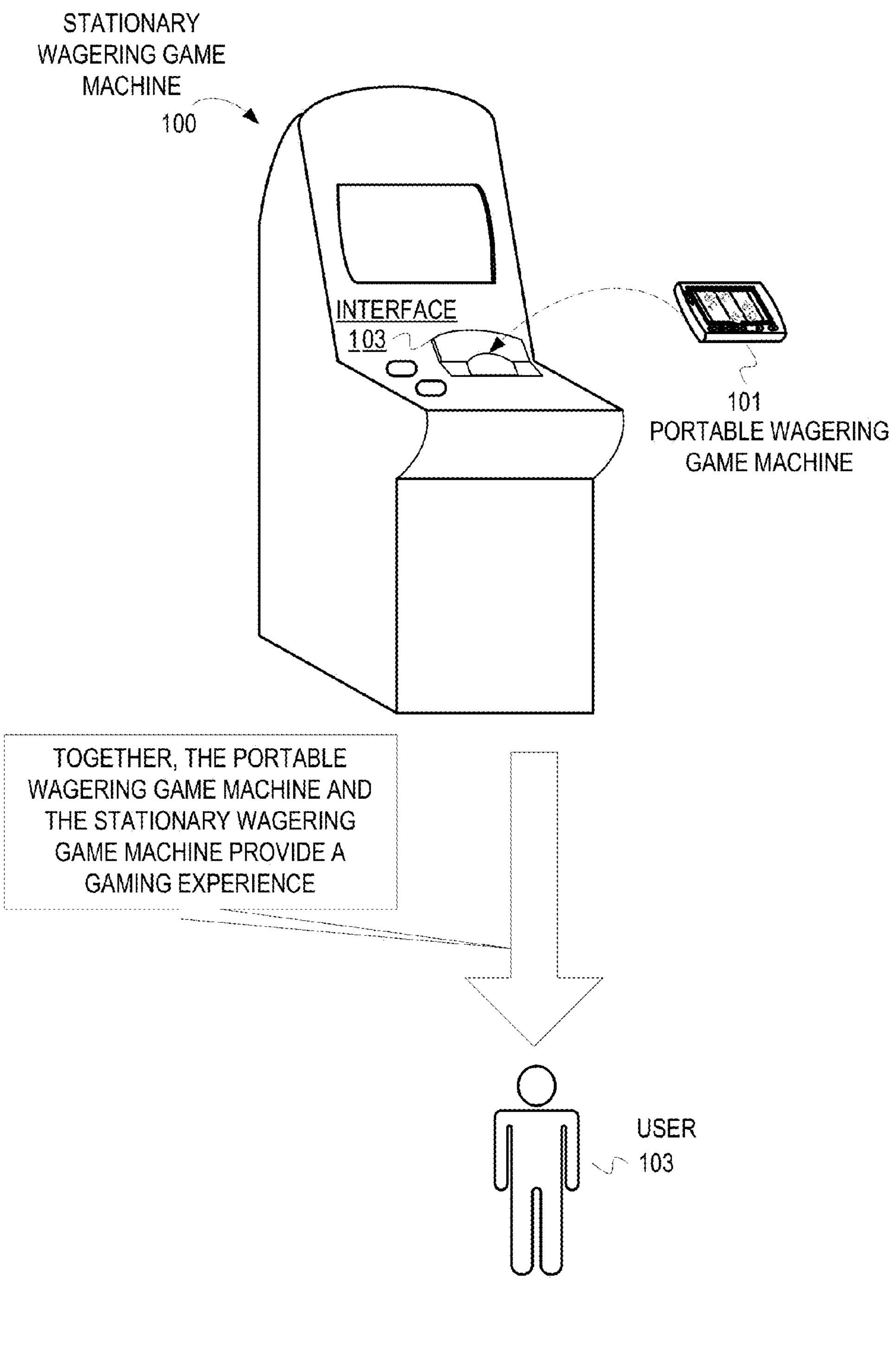
FIG. 1 depicts a portable wagering game machine and a stationary wagering game machine providing a wagering game experience to a user.

FIG. 1 depicts a portable wagering game machine and a stationary wagering game machine providing a wagering game experience to a user. A portable wagering game machine 101 is docked with a stationary wagering game machine 100 via an interface 103 on the SGM 100. Together, the PGM 101 and the SGM 100 provide a gaming experience to a user 103. The gaming experience is provided with the resources of both the PGM 101 and the SGM 100. For example, the larger display of the SGM 100 may be leveraged to display content from the PGM 101. In another example, a wireless communication port of the PGM 101 is leveraged by the SGM to transmit or receive data used and/or displayed by the SGM 100. This pooling of resources allows a legacy SGM to take advantage of the resources of a PGM.

Figure 2:
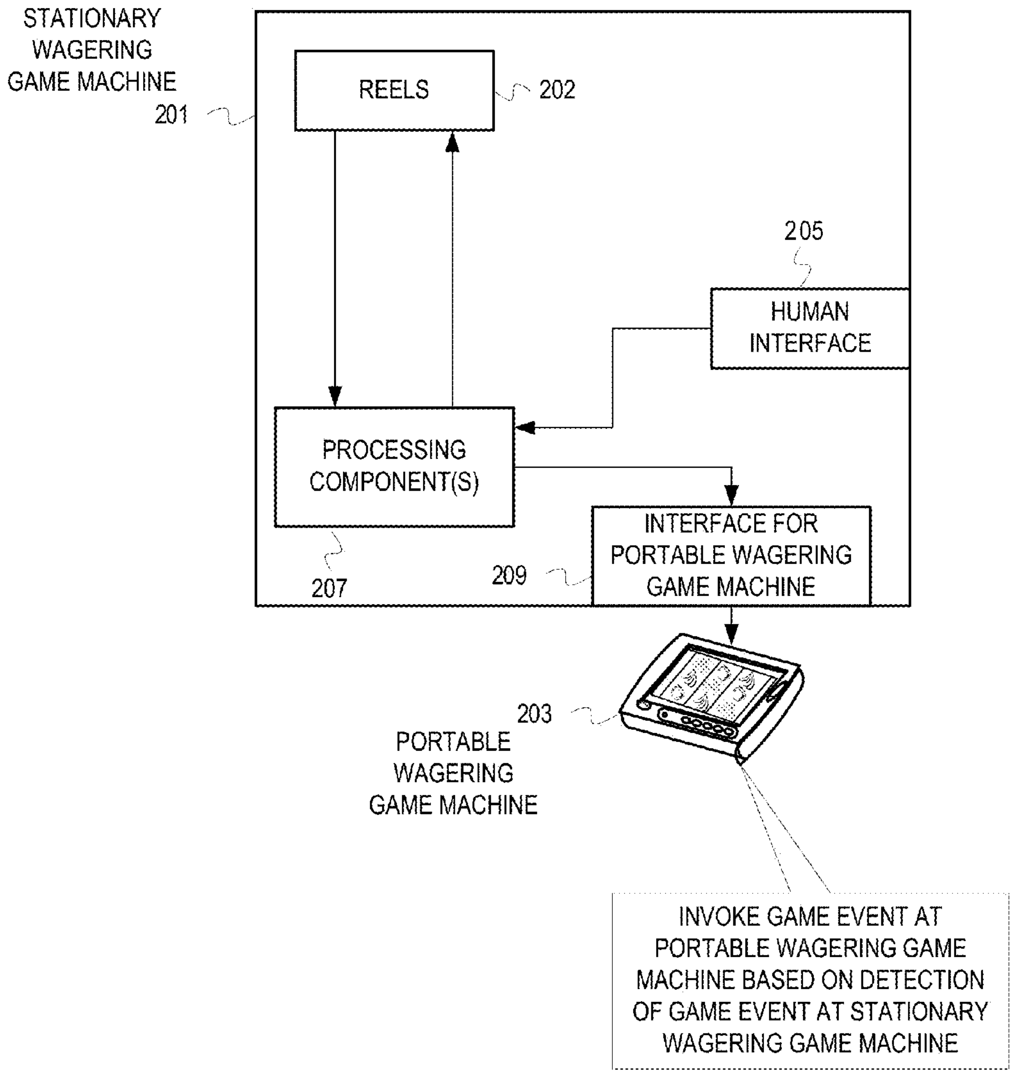
FIG. 2 depicts pooling resources of a stationary wagering game machine and a portable wagering game machine to provide game content from both machines.

FIG. 2 depicts pooling resources of a stationary wagering game machine and a portable wagering game machine to provide game content from both machines. A stationary wagering game machine 201 includes reels 202, processing components 207, a human interface 205 (e.g., button, handle, etc.), and an interface 209 for a portable wagering game machine. A portable wagering game machine 203 is associated with the stationary wagering game machine 201 via the interface 209. The interface 209 allows the portable wagering game machine 203 to monitor the SGM 201 and detect game events that occur at the SGM 201. The PGM 203 invokes game events at the PGM 203 responsive to detecting game events that occur at the SGM 201.

The PGM 203 can use different techniques to detect game events that occur at the SGM 201, which can vary based on the type of SGM (e.g., reels controlled by a computer and step motors, position of reels detected with metal contacts that close a circuit, reel position determined with photoelectric cells, etc.). In one embodiment, the PGM 203 may interpret signals sent from the processing components 207 to step motors that control the reels 202. In another embodiment, the electric signals that indicate reel position are sent to the PGM 203 for interpretation. In yet another embodiment, the PGM 203 monitors communications from the SGM 201 to an accounting system to determine if a game event occurs.

The PGM 203 may monitor communications from the SGM 201 to an accounting system with different techniques. For example, the same messages may be sent out of two ports on the SGM 201, one for the accounting system and one for the PGM 203. The PGM 203 may monitor an internal bus of the SGM 201 to detect messages to an accounting system that indicates reel stop. In another example, the PGM 203 registers with the accounting system and identifies the associated SGM 201. The accounting system then communicates game events to the PGM 203 for the SGM 201.

Figure 3:
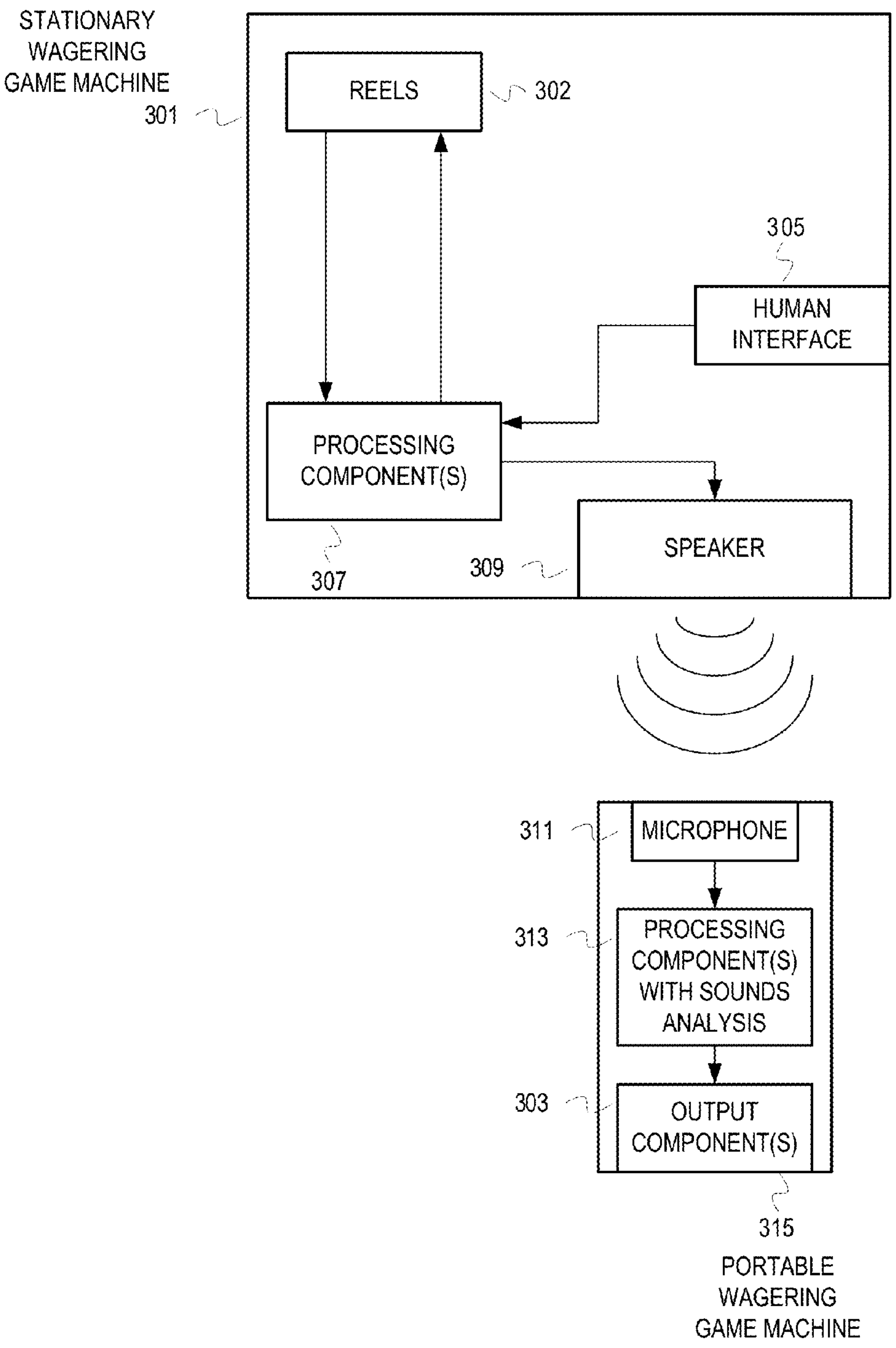
FIG. 3 depicts an example of a portable wagering game machine detecting a game event at a stationary wagering game machine with audible output from the stationary wagering game machine.

A PGM may also detect game events at a SGM without communicating with an accounting system and/or wiring into an SGM. FIG. 3 depicts an example of a portable wagering game machine detecting a game event at a stationary wagering game machine with audible output from the stationary wagering game machine. A stationary wagering game machine 301 includes reels 302, processing components 307, a human interface 305 (e.g., button, handle, etc.), and a speaker 309. A portable wagering game machine 315 includes a microphone 311, a processing component(s) 313 with sound analysis capability, and an output component 303. When a game event occurs at the SGM 301, the SGM 301 outputs an indication of the game event, such as an auditory indication (e.g., sirens sounds, a melody, etc.). Perhaps, the SGM 301 outputs different auditory indications for different types of game events. The PGM 303 detects the auditory indications with the microphone 311. The auditory indications may be converted to digital representation of the auditory indication and passed to the processing component(s) 313. If appropriate, the PGM 301 invokes a game event (e.g. a bonus round) that is indicated with the output component 303 (e.g., sound is played, animation is displayed, etc.). Winnings for the game event at the PGM 301 may be credited at the PGM 301 or communicated to a back-end accounting system for later pay out. Detecting game events based on auditory indications allows the PGM and the SGM to provide game content together without modification to the SGM.

Figure 4:
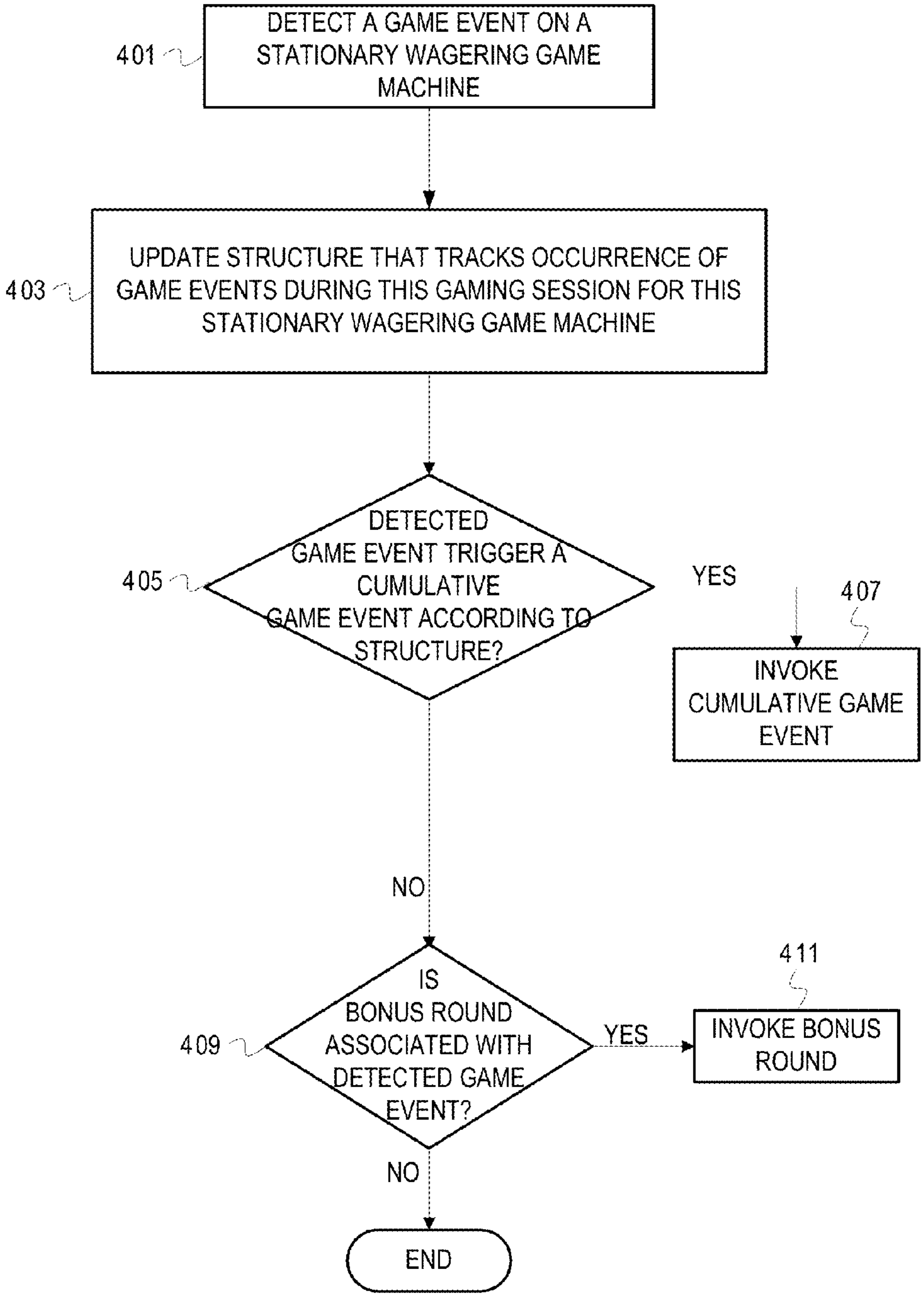
FIG. 4 depicts a flowchart of example operations for invoking a game event at a portable wagering game machine responsive to detecting a game event at a stationary wagering game machine.

FIG. 4 depicts a flowchart of example operations for invoking a game event at a portable wagering game machine responsive to detecting a game event at a stationary wagering game machine. At block 401, a PGM detects a game event on a stationary wagering game machine. At block 403, the PGM updates a structure that tracks occurrence of game events during a particular game session at the SGM. For instance, each time a PGM is associated with a SGM, the PGM initializes the structure. When a game event that occurs at the SGM is detected by the PGM, then the structure is updated to reflect occurrence of the SGM game event. The tracking mechanism allows for various features, such as escrow type games, diverse bonus rounds for different reel combinations or game events, etc.

At block 405, the PGM determines whether the detected game event triggers a cumulative game event (e.g., escrow game event, piggybank game event, etc.) according to the structure. If the detected game event triggers a cumulative game event, then control flows to block 407. If the detected game event does not trigger a cumulative game event, then control flows to block 409.

At block 407, the PGM invokes a cumulative game event.

At block 409, the PGM determines if a bonus round is associated with the detected game event. If a bonus round is associated with the detected game event, then control flows to block 411. If not, then the operations end. At block 411, the PGM invokes the bonus round.

Figure 5:
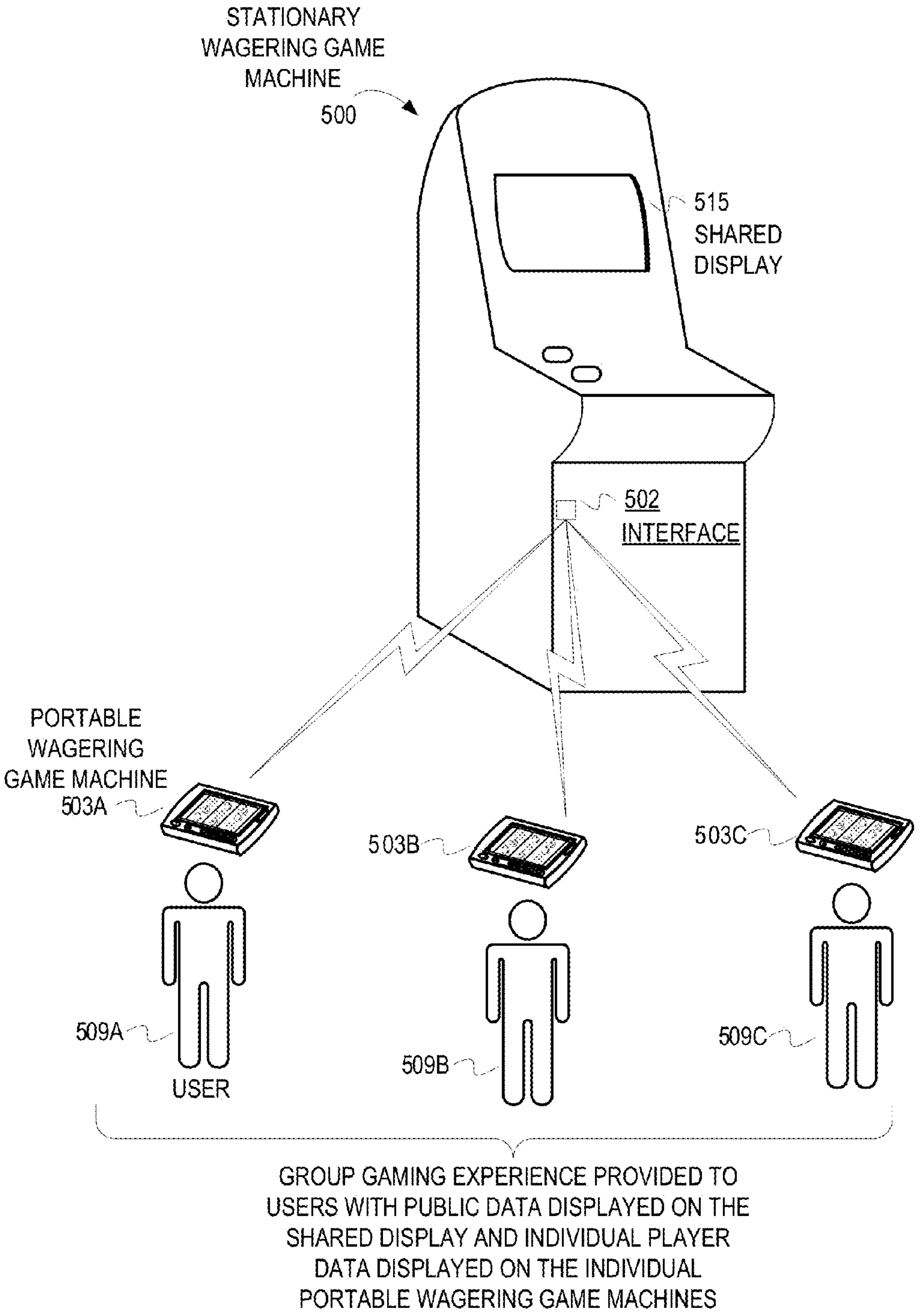
FIG. 5 depicts a portable wagering game machine and multiple stationary wagering game machines providing a group type wagering game experience.

Pooling of resources of a PGM and a SGM may do more than augment or supplement game content at an SGM. Pooling resources of the PGM and the SGM may also allow for group type wagering games. FIG. 5 depicts a portable wagering game machine and multiple stationary wagering game machines providing a group type wagering game experience. PGMs 503A-503C are associated with a SGM 500. The SGM 500 includes a display 515 and an interface 502 (e.g., wireless interface). Data for a group wagering game is passed between the SGM 500 and the PGMs 503A-503C via the interface 502. Data for viewing by a particular user are displayed at a particular PGM. In FIG. 5, data for viewing by users 509A-509C are respectively displayed at the PGMs 509A-509C. Data for display to all of the users 509A-509C are displayed at the display 515.

A variety of group wagering games can take advantage of this sharing of resources between multiple PGMs and a SGM. For example, the numbers selected by individuals for keno may be presented on respective PGMs while numbers selected by the system are presented on the SGM. As another example, a virtual roulette wheel may be displayed on the SGM with player's selected numbers indicated on PGM displays. Many other existing games (e.g., poker) and new wagering games can leverage the shared resources, but separate displays of such a configuration.

Figure 6:
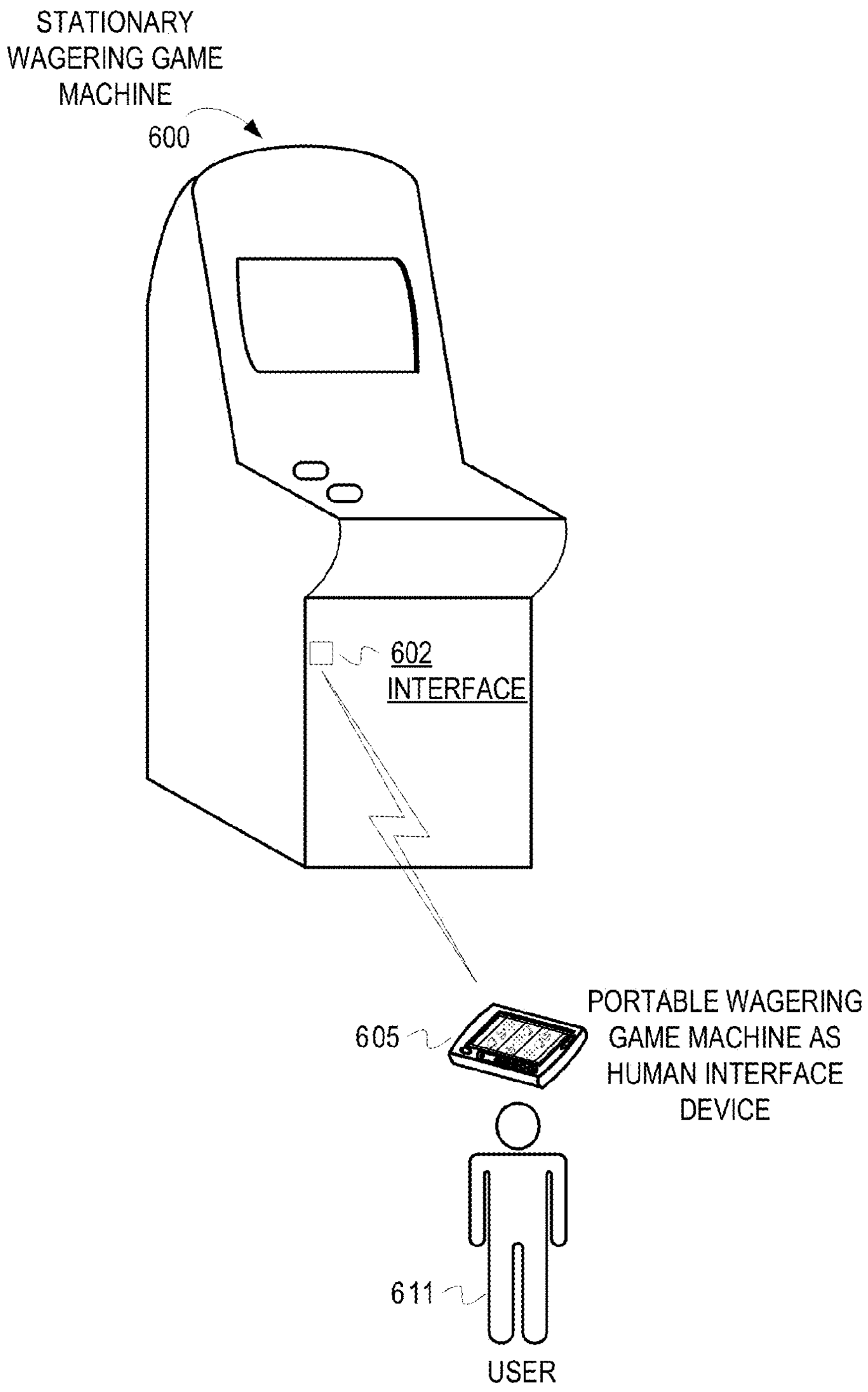
FIG. 6 depicts an example of a portable wagering game machine being used as a human interface device for a SGM.

A PGM may be used for more than processing and display, though. A PGM may also be used as a human interface device for a SGM. FIG. 6 depicts an example of a portable wagering game machine being used as a human interface device for a SGM. A SGM 600 includes an interface 602. FIG. 6 depicts wireless communication between the SGM 600 and a PGM 605 via the interface 602. Even though a wireless communication is depicted, the interface 602 may be a serial port, a parallel port, etc.

A user 611 may use the PGM 605 in a number of ways as a human interface device. The PGM 605 may include functionality and/or components for a variety of human interface devices, be programmed by flashing memory in the PGM 605 when checked out by the user 611, query the SGM 600 to determine or be programmed for a particular human interface device functionality, etc. Examples of human interface devices that the PGM may operate as include a touch screen, game wand, remote control, etc. For instance, the user 611 may enter selections or wager amounts with the PGM 605.

The user 611 may sit in a massage chair while using the PGM 605 as a remote control to play the SGM 600.

Figure 7:
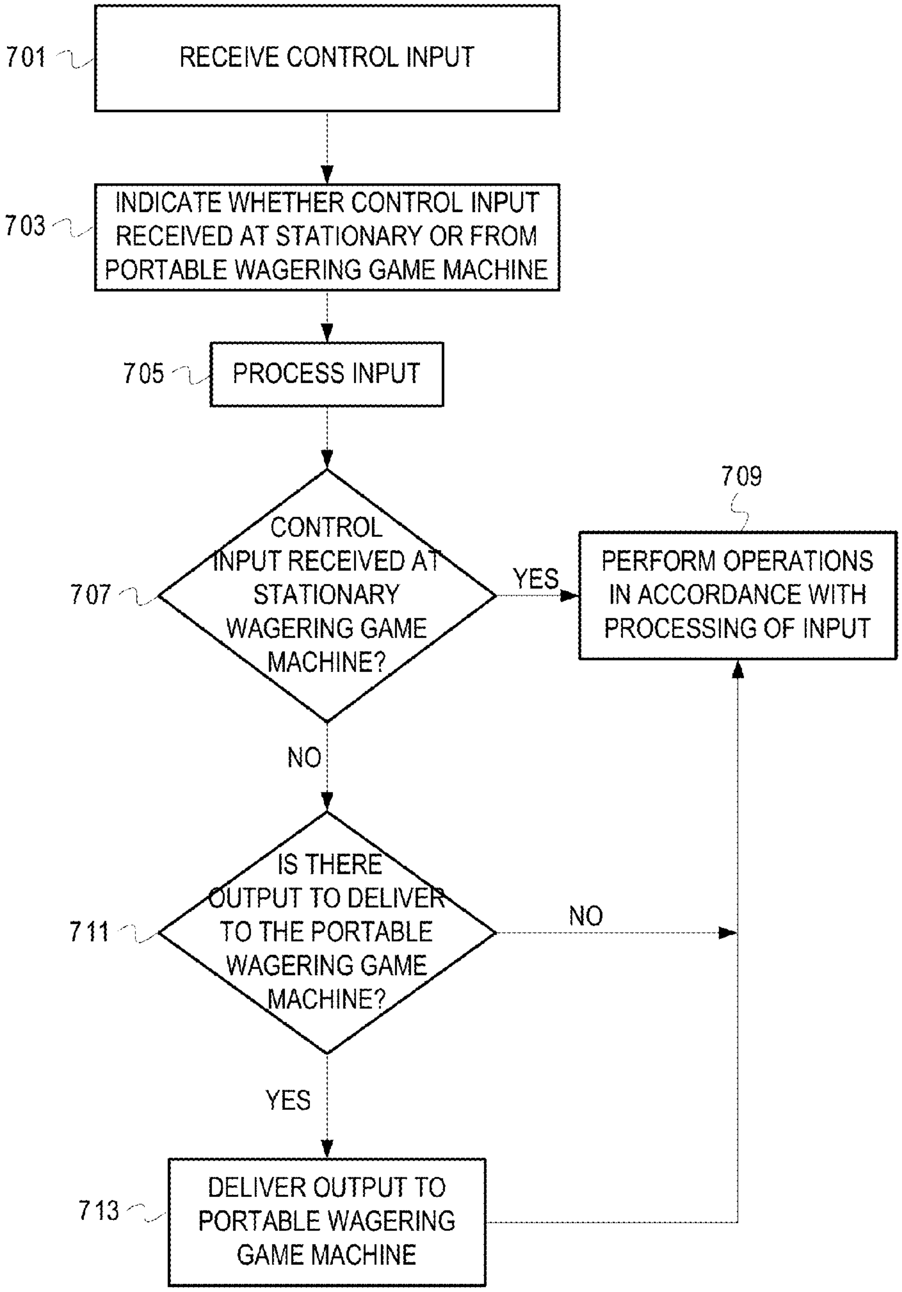
FIG. 7 depicts a flowchart of example operations for a stationary wagering game machine to process control input from a portable wagering game machine.

FIG. 7 depicts a flowchart of example operations for a stationary wagering game machine to process control input from a portable wagering game machine. At block 701, a SGM receives control input. At block 703, the SGM indicates whether the received control input is received at the SGM or from a PGM. For example, the SGM sets a flag in a data structure.

At block 705, the control input is processed. At block 707, the SGM refers back to the indication made at block 703 to determine whether the control input was received at the SGM or from a PGM. If the control input was received from a PGM, then control flows to block 709.

At block 709, the SGM performs operations in accordance with the processing performed at block 705 (e.g., updates a display, spins reels, etc.).

At block 711, the SGM determines if there is any output from the processing to deliver to the PGM. If there is no output to deliver then, control flows to block 709. If there is output to deliver, then control flows to block 713.

At block 713, the output is delivered to the PGM. Control flows from block 713 to block 709.

Providing a wagering game experience with the resources of both a PGM and a SGM is not limited to using the PGM as a human interface device or augmenting and/or supplementing game content of a SGM. A PGM and SGM may interact to add other functionality to provide a wagering game experience to a user. For instance, a PGM may add electronic funds transfer functionality. In addition, the PGM and the SGM together may provide a wagering game experience with hospitality services related functionality.

Figure 8:
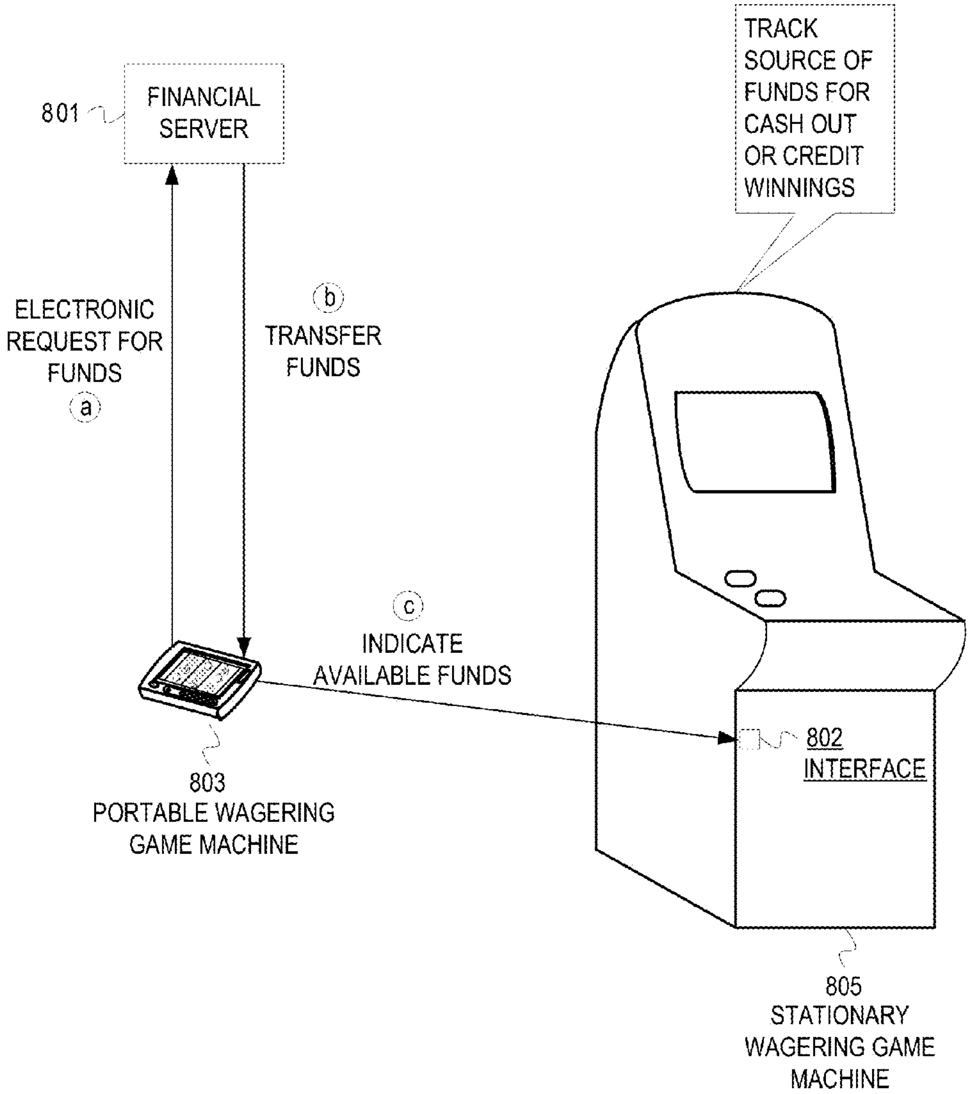
FIG. 8 depicts an example of a portable wagering game machine adding electronic funds transfer functionality to a stationary wagering game machine.

FIG. 8 depicts an example of a portable wagering game machine adding electronic funds transfer functionality to a stationary wagering game machine. At a time a, a PGM 803 sends an electronic request for funds to a financial server 801 (e.g., a system capable of accessing a user's financial account). The financial server 801 transfers funds to the PGM 803 at a time b. Of course, other servers may be involved and/or the funds may be transferred by a server other than the financial server 801. At a time c, the PGM 803 indicates funds available from the funds transfer to a SGM 805 via an interface 802 on the SGM 805. The SGM 805 keeps track of the source of the funds (i.e., the PGM 803) for cash out and/or pay out. So, the SGM 805 can credit the PGM 803 or pay cash.

The transfer of funds and credits can be implemented in a variety of ways. For example, the funds may actually be transferred to a casino account created for a player. The funds are represented at a PGM, but actual funds are withdrawn and/or deposited to the casino account (i.e., an account remote from the PGM). In another example, the funds are put into an escrow and a final amount withdrawn or deposited to a player's account when the player settles (e.g., has finished playing for the day).

Figure 9:
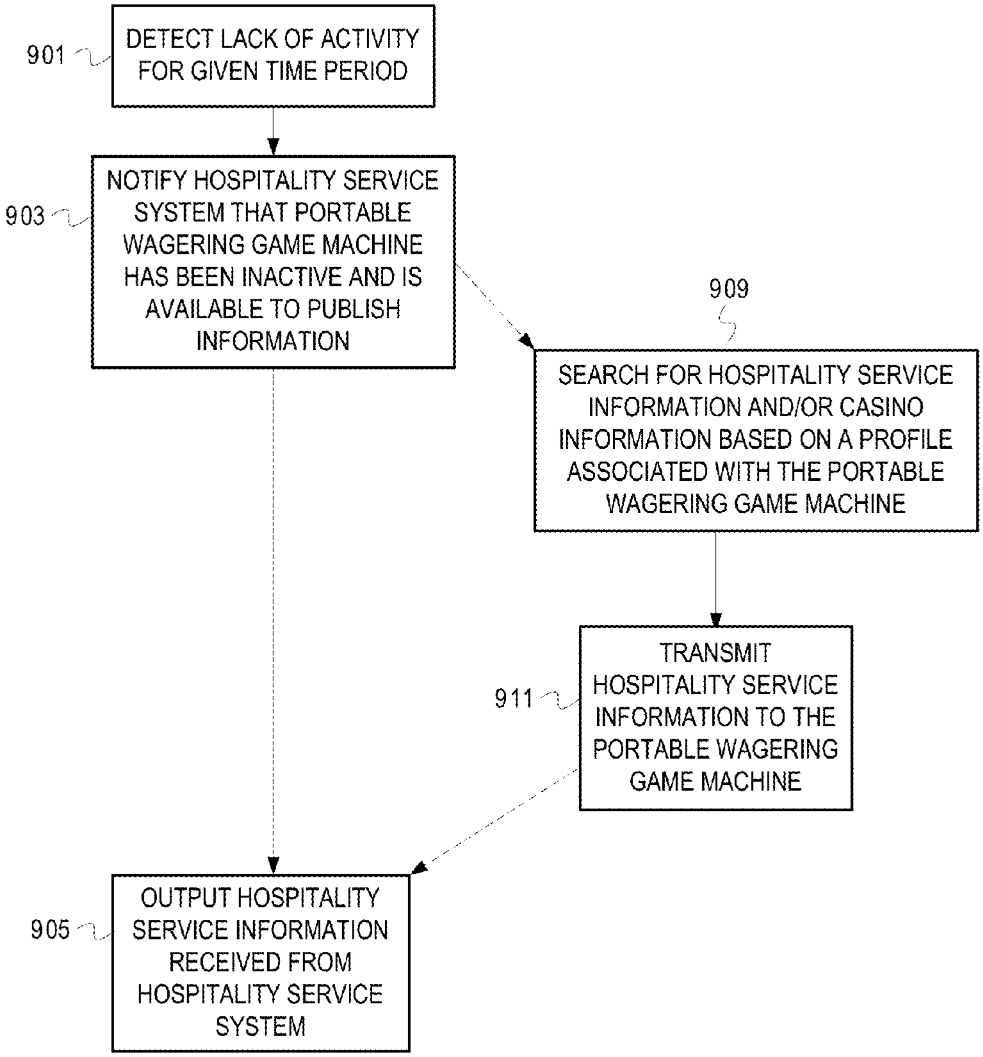
FIG. 9 depicts an example flowchart of example operations for publishing information for hospitality services or casino announcements.
Figure 10:
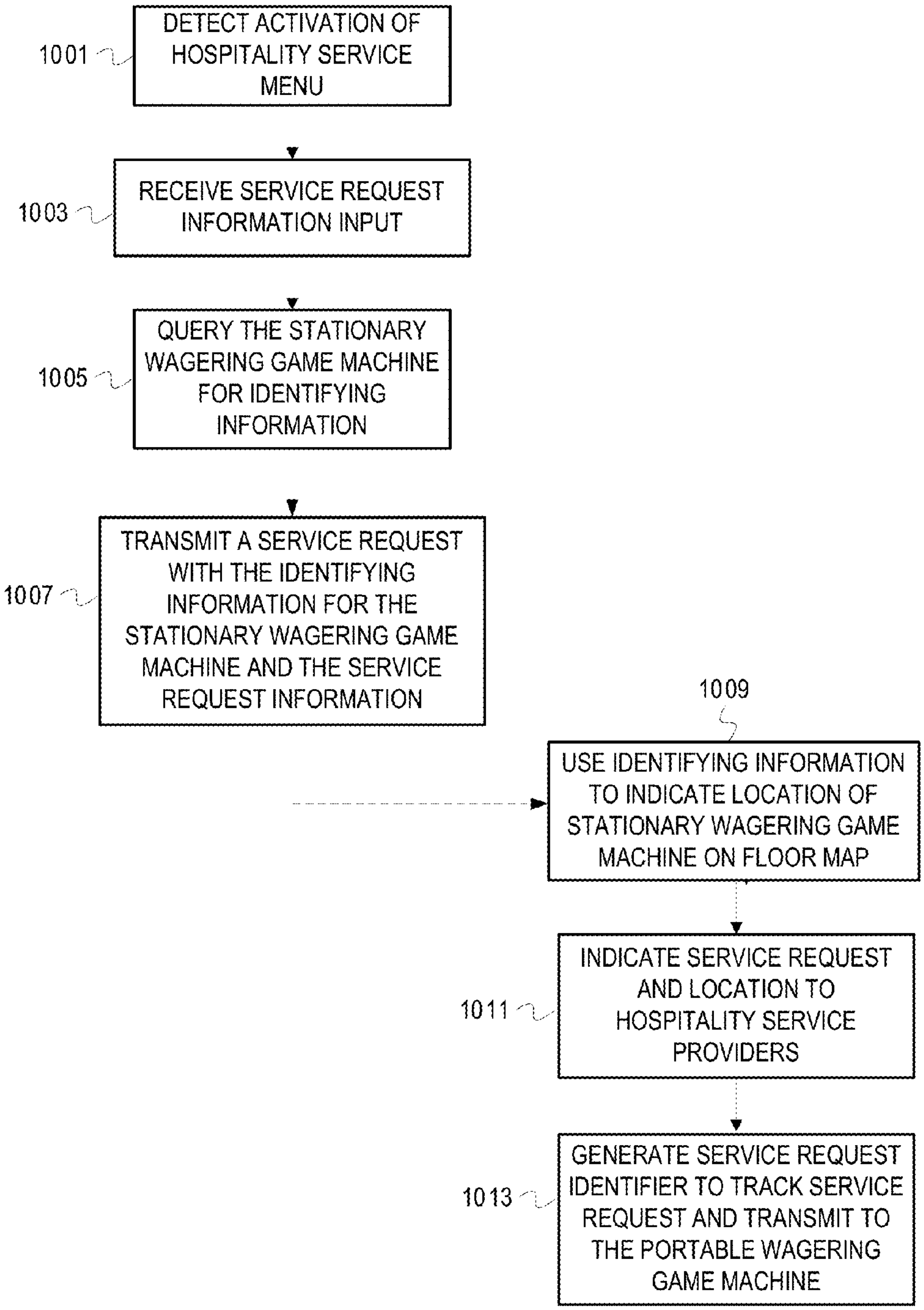
FIG. 10 depicts a flowchart of example operations for locating customers for hospitality services.

FIGS. 9 and 10 depict flowcharts of example operations for hospitality services. FIG. 9 depicts an example flowchart of example operations for publishing information for hospitality services or casino announcements. At block 901, a PGM detects a lack of activity (e.g., a given amount of time has expired without any activity). At block 903, the PGM notifies a hospitality service system that the PGM has been inactive and is available for publishing information.

At block 909, the hospitality service system searches for hospitality services information and/or casino announcements based on a profile of a user associated with the PGM. For example, the hospitality service system accesses a database to determine who has checked out the PGM and then accesses a profile for that user. In another example, the PGM transmits the profile or an identifier of the user that checked out the PGM to the hospitality system.

At block 911, the hospitality service system transmits information yielded from the search to the PGM. Examples of the information include information about new wagering games, open tables, show times, advertisements for beverages, advertisements for cigars, etc.

At block 905, the PGM outputs the information received from the hospitality service system (e.g., audio, video, animation, text, etc.). The PGM may output or publish the information for a given time period, until the PGM is activated for wagering game use, until disassociated from a stationary wagering game machine, until associated with a wagering game machine, interruption by a user, etc.

FIG. 10 depicts a flowchart of example operations for locating customers for hospitality services. At block 1001, a PGM detects activation of a hospitality service menu on the PGM. At block 1003, the PGM receives service request information input by a user. At block 1005, the PGM queries a SGM associated with the PGM for information that identifies the SGM. At block 1007, the PGM transmits a service request to a hospitality service system. The service request includes the information that identifies the SGM and the service request information or some form of the service request information (e.g., the input from a user is encoded for the hospitality service system).

At block 1009, the hospitality service system uses the information that identifies the SGM to indicate location of the SGM. At block 1011, the hospitality services system indicates the service request and location of the SGM to a hospitality service provider. For example, an electronic floor map is updated to highlight the located SGM and display the service request. In another example, a text message is transmitted to a hospitality service provider in proximity of the SGM.

At block 1013, the hospitality service system generates a service request identifier for the service request and transmits the service request identifier to the PGM. The service request identifier can be used to track the service request. If the PGM status changes (e.g., the user moves to a different SGM), the PGM may use the service request identifier to notify the hospitality service system of the change in location or lack of association with a SGM. The hospitality service system may suspend servicing the service request, cancel the service request, request a location update within a given time period, etc.

It should be understood that the operations depicted in the flowcharts are meant to aid in understanding embodiments of the invention and should not be used to limit embodiments. For example, block 709 of FIG. 7 may be performed before or in parallel with block 707. In FIG. 10, block 1005 may be performed prior to block 1001 (e.g., the PGM reads an RFID tag on the SGM when near the SGM).

In addition to providing a wagering game experience, a portable wagering game machine can be docked with a stationary wagering game machine for configuration of the stationary wagering game machine. The portable wagering game machine may be used to update game content, change game content, modify game parameters, etc. The portable wagering game machine may also be used to copy game content between stationary wagering game machines or write game content to a blank stationary wagering game machine.

The described embodiments may be provided as a computer program product, or software, that may include a machine-readable medium having stored thereon instructions, which may be used to program a computer system (or other electronic device(s)) to perform a process according to embodiments of the invention, whether presently described or not, since every conceivable variation is not enumerated herein. A machine readable medium includes any mechanism for storing or transmitting information in a form (e.g., software, processing application) readable by a machine (e.g., a computer). A machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of storage medium suitable for storing electronic instructions. In contrast, a machine-readable signal medium may include an electrical, optical, acoustical or other form of propagated signal (e.g., carrier waves, infrared signals, digital signals, etc.), or wireline, wireless, or other communications medium.

Figure 11:
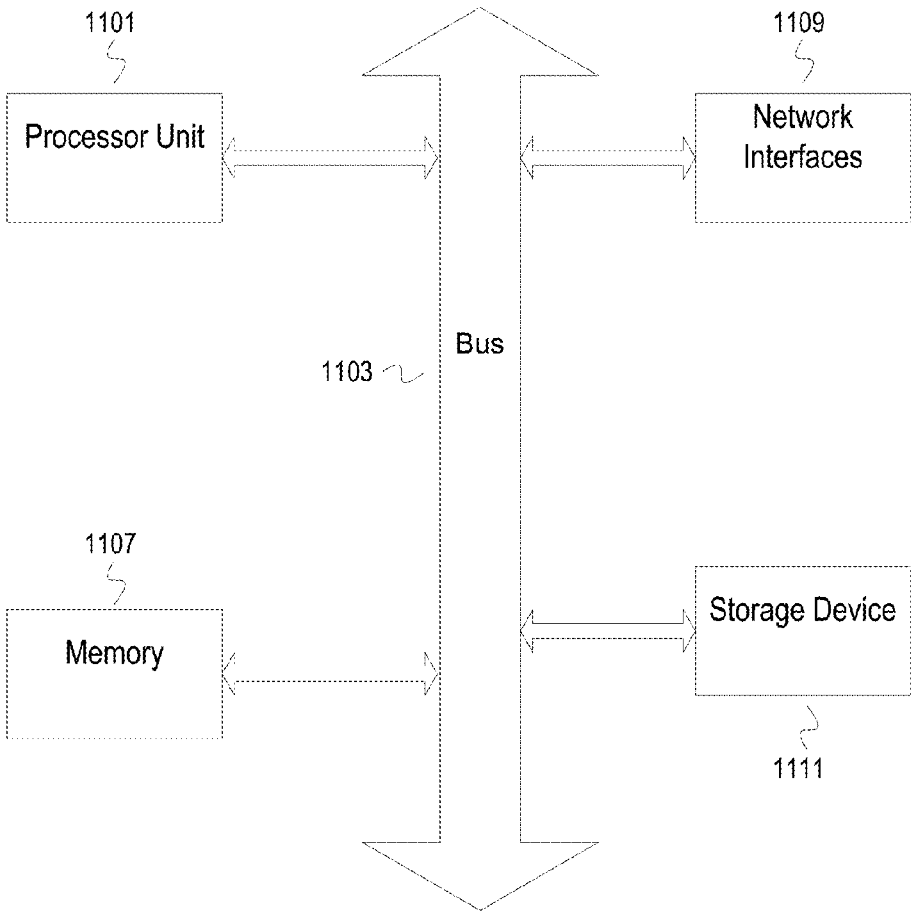
FIG. 11 depicts an example portable wagering game machine.

FIG. 11 depicts an example portable wagering game machine. A portable wagering game machine includes a processor unit 1101 (possibly including multiple processors, multiple cores, multiple nodes, and/or implementing multi-threading, etc.). The portable wagering game machine includes memory 1107. The memory 1107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The portable wagering game machine also includes a bus 1103 (e.g., PCI, ISA, PCI-Express, HyperTransport®, InfiniBand®, NuBus, etc.), a network interface 1109 (e.g., an ATM interface, an Ethernet interface, a Frame Relay interface, SONET interface, wireless interface, etc.), and a storage device(s) 1111 (e.g., optical storage, magnetic storage, etc.). The system memory 1107 embodies functionality to implement embodiments described above. The system memory 1107 may include one or more functionalities that facilitate the embodiments described herein. Any one of these functionalities may be partially (or entirely) implemented in hardware and/or on the processing unit 1101. For example, the functionality may be implemented with an application specific integrated circuit, in logic implemented in the processing unit 1101, in a co-processor on a peripheral device or card, etc. Further, realizations may include fewer or additional components not illustrated in FIG. 11 (e.g., video cards, audio cards, additional network interfaces, peripheral devices, etc.). The processor unit 1101, the storage device(s) 1111, and the network interface 1109 are coupled to the bus 1103. Although illustrated as being coupled to the bus 1103, the memory 1107 may be coupled to the processor unit 1101.

While the embodiments are described with reference to various implementations and exploitations, it will be understood that these embodiments are illustrative and that the scope of the invention(s) is not limited to them. In general, techniques for providing a wagering game experience with resources of both a PGM and a SGM as described herein may be implemented with facilities consistent with any hardware system or hardware systems. Many variations, modifications, additions, and improvements are possible.

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole. This detailed description does not, therefore, limit embodiments of the invention, which are defined only by the appended claims. Each of the embodiments described herein is contemplated as falling within the inventive subject matter, which is set forth in the following claims.

What is claimed is:

1. A method comprising:

detecting, by a portable game machine, occurrence of a first game event at a stationary wagering game machine that is associated with the portable game machine;

in response to said detecting the occurrence of the first game event at the stationary wagering game machine, determining, by the portable game machine, a second game event triggered by the first game event; and invoking the second game event at the portable game machine with resources of the portable game machine.

2. The method of claim 1 further comprising monitoring the stationary wagering game machine for indications of game events.

3. The method of claim 1, wherein said determining the second game event corresponding to the first game event comprises:

accessing a data structure on the portable game machine; and determining that the second game event is associated with the first game event based, at least in part, on said accessing the data structure on the portable game machine, wherein the data structure indicates a first plurality of game events and a second plurality of game events triggered by corresponding ones of the first plurality of game events.

4. The method of claim 3 further comprising updating the data structure to reflect said invoking the second game event.

5. The method of claim 3 further comprising initializing the data structure for the stationary wagering game machine responsive to the portable game machine being associated with stationary wagering game machine.

6. The method of claim 1 further comprising associating the portable game machine with the stationary wagering game machine.

7. The method of claim 1, wherein said associating the portable game machine with the stationary wagering game machine comprises docking the portable game machine with the stationary wagering game machine via an interface of the stationary wagering game machine.

8. The method of claim 1, wherein said determining, by the portable game machine, the second game event triggered by the first game event comprises:

determining whether the first game event triggers a cumulative game event or a bonus game event, wherein the second game event is the cumulative game event if the first game event triggers the cumulative game event, wherein the second game event is the bonus game event if the first game event triggers the bonus game event.

9. The method of claim 1, wherein said detecting, by the portable game machine, the occurrence of the first game event at the stationary wagering game machine comprises detecting, via a microphone of the portable game machine, an auditory indication of the first game event, the auditory indication being output by the stationary wagering game machine.

10. The method of claim 1, wherein the second game event comprises one of a bonus game event and a cumulative game event.

11. One or more non-transitory machine-readable storage media having program instructions stored thereon, the program instructions comprising:

program instructions to detect occurrence of a first game event at a stationary wagering game machine that is associated with a portable game machine executing the program instructions;

program instructions to determine a second game event triggered by the first game event in response to detection of the occurrence of the first game event at the stationary wagering game machine; and program instructions to invoke the second game event at the portable game machine with resources of the portable game machine.

12. The non-transitory machine-readable storage media of claim 11 further comprising program instructions to monitor the stationary wagering game machine for indications of game events.

13. The non-transitory machine-readable storage media of claim 11, wherein the program instructions to detect the occurrence of the first game event at the stationary wagering game machine comprise program instructions to detect, via a microphone of the portable game machine, an auditory indication of the first game event, the auditory indication being output by the stationary wagering game machine.

14. The non-transitory machine-readable storage media of claim 11, wherein the program instructions to determine the second game event corresponding to the first game event comprise program instructions to:

access a data structure on the portable game machine; and determine that the second game event is associated with the first game event based, at least in part, on access of the data structure on the portable game machine, wherein the data structure indicates a first plurality of game events and a second plurality of game events triggered by corresponding ones of the first plurality of game events.

15. The non-transitory machine-readable storage media of claim 14 further comprising program instructions to initialize the data structure for the stationary wagering game machine responsive to the portable game machine being associated with stationary wagering game machine.

16. The non-transitory machine-readable storage media of claim 11, wherein the program instructions to determine the second game event triggered by the first game event comprise program instructions to:

determine whether the first game event triggers a cumulative game event or a bonus game event, wherein the second game event is the cumulative game event if the first game event triggers the cumulative game event, wherein the second game event is the bonus game event if the first game event triggers the bonus game event.

17. A portable game machine comprising:

a display;

an interface operable to receive at least one of data and signals;

a processor unit coupled with the display and the network interface;

a machine-readable storage media coupled with the processor unit and having program instructions stored thereon, the program instructions including, program instructions to detect occurrence of the first game event at a stationary wagering game machine that is associated with the portable game machine;

program instructions to determine a second game event triggered by the first game event in response to detection of the occurrence of the first game event at the stationary wagering game machine; and program instructions to invoke the second game event at the portable game machine with resources of the portable game machine.

18. The portable game machine of claim 17, wherein the program instructions to determine the second game event corresponding to the first game event comprise program instructions to:

access a data structure on the portable game machine; and determine that the second game event is associated with the first game event based, at least in part, on access of the data structure on the portable game machine, wherein the data structure indicates a first plurality of game events and a second plurality of game events triggered by corresponding ones of the first plurality of game events.

19. The portable game machine of claim 18 further comprising program instructions to initialize the data structure for the stationary wagering game machine responsive to the portable game machine being associated with stationary wagering game machine.

20. The portable game machine of claim 17 further comprising a microphone, wherein the program instructions to detect the occurrence of the first game event at the stationary wagering game machine comprises program instructions to detect an auditory indication of the first game event, the auditory indication being output by the stationary wagering game machine and received via the microphone.

* * * * *